US010562252B2

(12) United States Patent
Seto (10) Patent No.: US 10,562,252 B2
(45) Date of Patent: Feb. 18, 2020

(54) TIRE MANUFACTURING METHOD (71) Applicant: The Yokohama Rubber Co., LTD., Minato-ku, Tokyo (JP)

(72) Inventor: Hideki Seto, Oiwake (JP)

(73) Assignee: The Yokohama Rubber Co., LTD. (JP)

(*) Notice: Subject to any disclaimer, the term of this patent is extended or adjusted under 35 U.S.C. 154(b) by 371 days.

(21) Appl. No.: 14/787,247

(22) PCT Filed: Apr. 18, 2014

(86) PCT No.: PCT/JP2014/061016
§ 371 (c)(1),
(2) Date: Oct. 26, 2015

(87) PCT Pub. No.: WO2014/175174
PCT Pub. Date: Oct. 30, 2014

(65) Prior Publication Data
US 2016/0114545 A1    Apr. 28, 2016

(30) Foreign Application Priority Data

Apr. 26, 2013   (JP) .................... 2013-093740

(51) Int. Cl.
*B26D 3/00*    (2006.01)
*B29D 30/06*   (2006.01)
(Continued)

(52) U.S. Cl.
CPC ......... *B29D 30/0681* (2013.01); *B26D 3/003* (2013.01); *B29C 65/70* (2013.01);
(Continued)

(58) Field of Classification Search
CPC .......... B26D 3/003; B26D 3/005; B26D 3/06; B26D 1/14; B26D 1/15; B26D 1/04;
(Continued)

(56) References Cited

U.S. PATENT DOCUMENTS 4,426,901 A * 1/1984 Hogan ................. B26D 5/12
                                              225/101
4,965,733 A * 10/1990 Kimura ................ B29D 30/46
                                              700/167

(Continued)

FOREIGN PATENT DOCUMENTS

JP    9-29858 A   *  2/1997
JP    H0929858 A  *  2/1997
(Continued)

OTHER PUBLICATIONS

International Search Report for International Application No. PCT/JP2014/061016 dated Jul. 8, 2014, 2 pages, Japan.

*Primary Examiner* — Robert C Dye
*Assistant Examiner* — Cedrick S Williams
(74) *Attorney, Agent, or Firm* — Thorpe North & Western (57) ABSTRACT The present technology provides a tire manufacturing method comprising: positioning a cutting edge cradle on an elastomer layer side of the sheet laminate; pressing a circular blade, which dependently rotates from the sheet side of the sheet laminate comprising a thermoplastic resin or a thermoplastic resin composition, against the sheet laminate placed on the cutting edge cradle so as to cut the sheet laminate; and forming end sections of the sheet laminates to be superimposed.

10 Claims, 7 Drawing Sheets (51) Int. Cl.
  *B29C 65/70* (2006.01)
  *B29C 69/00* (2006.01)
  *B26D 1/14* (2006.01)
  *B26D 1/15* (2006.01)
  *B29K 9/06* (2006.01)
  *B29K 23/00* (2006.01)
  *B29K 25/00* (2006.01)
  *B29K 77/00* (2006.01)
  *B29K 105/00* (2006.01)

(52) U.S. Cl.
  CPC ........ *B29C 69/001* (2013.01); *B29D 30/0601* (2013.01); *B26D 1/14* (2013.01); *B26D 1/15* (2013.01); *B29D 2030/0682* (2013.01); *B29K 2009/06* (2013.01); *B29K 2023/08* (2013.01); *B29K 2025/08* (2013.01); *B29K 2077/00* (2013.01); *B29K 2105/0085* (2013.01); *B29K 2105/0088* (2013.01); *B29K 2105/256* (2013.01)

(58) Field of Classification Search
  CPC .. B29D 30/0681; B29D 69/001; B29D 30/42; B29D 2030/421; B29D 2030/423; B29D 2030/061
  See application file for complete search history.

(56) References Cited

U.S. PATENT DOCUMENTS

| | | | | |
|---|---|---|---|---|
| 5,325,754 A | * | 7/1994 | Pohl | B26D 3/003 83/488 |
| 5,887,506 A | * | 3/1999 | Murphy | B26D 1/205 83/835 |
| 5,992,486 A | * | 11/1999 | Katsuki | B60C 1/0008 152/510 |
| 2003/0150306 A1 | * | 8/2003 | Sala | B26D 1/0006 83/171 |
| 2008/0041206 A1 | * | 2/2008 | Mergola | B26F 1/44 83/343 |
| 2009/0131592 A1 | * | 5/2009 | Sakai | B32B 25/08 525/190 |
| 2010/0126646 A1 | * | 5/2010 | Kudo | B29D 30/0681 152/450 |
| 2010/0181000 A1 | * | 7/2010 | Takahashi | B29D 30/0681 152/532 |
| 2010/0193098 A1 | * | 8/2010 | Kirino | C08L 23/22 152/450 |
| 2013/0276971 A1 | | 10/2013 | Seto | |

FOREIGN PATENT DOCUMENTS

| | | | | |
|---|---|---|---|---|
| JP | H0966491 A | * | 3/1997 | |
| JP | 2001-232696 | | 8/2001 | |
| JP | 2001232696 A | * | 8/2001 | ......... B29D 30/0681 |
| JP | 2005238759 A | * | 9/2005 | |
| JP | 2007-112015 | | 5/2007 | |
| JP | 2007112015 A | * | 5/2007 | ............ B29C 43/24 |
| JP | 2009-241855 | | 10/2009 | |
| JP | WO 2012086801 A1 | * | 6/2012 | ......... B29C 66/0246 |
| JP | 5146591 | | 2/2013 | |
| WO | WO 2012/086801 | | 6/2012 | |
| WO | WO 2013/094247 | | 6/2013 | |

* cited by examiner

TIRE MANUFACTURING METHOD

TECHNICAL FIELD

The present technology relates to a tire manufacturing method.

More particularly, the present technology relates to a tire manufacturing method having a step in which end sections of a sheet laminate, which are obtained by laminating an elastomer layer with a sheet comprising a thermoplastic resin or a thermoplastic resin composition obtained by blending a thermoplastic resin with an elastomer, are superimposed and molded, wherein after the tire has begun moving, cracks are not generated in the vicinity of a splice portion of the sheet laminate, enabling the tire to have excellent durability.

BACKGROUND

In recent years, the use of a sheet comprising a thermoplastic resin or a thermoplastic resin composition obtained by blending a thermoplastic resin and an elastomer in a pneumatic tire inner liner has been proposed and studied (Japanese Unexamined Patent Application Publication No. 2009-241855A).

When actually using a sheet comprising a thermoplastic resin or a thermoplastic resin composition obtained by blending a thermoplastic resin and an elastomer in a pneumatic tire inner liner, a manufacturing technique of winding a sheet laminate of the sheet of a thermoplastic resin or a thermoplastic resin composition obtained by blending a thermoplastic resin and an elastomer and an elastomer layer that undergoes vulcanization adhesion to the sheet of a thermoplastic resin or a thermoplastic resin composition obtained by blending a thermoplastic resin onto a tire molding drum, performing a lap splice, and then supplying the product to the tire vulcanization molding process is ordinarily used.

However, when a tire is manufactured by cutting the aforementioned laminate sheet comprising an elastomer layer and a sheet comprising a thermoplastic resin or a thermoplastic resin composition obtained by blending a thermoplastic resin and an elastomer, which is wound so as to form a roll-like winding, to a prescribed size (length) by pulling out a portion of a required length from the roll-like winding, winding the sheet onto a tire molding drum, performing a lap splice on the drum or the like, and further performing vulcanization molding, separation may occur between the sheet of the thermoplastic resin or thermoplastic resin composition constituting an inner liner and the elastomer layer 3 subjected to vulcanization adhesion to the sheet 2 of the thermoplastic resin or thermoplastic resin composition after the tire has begun moving.

Figure 2A:
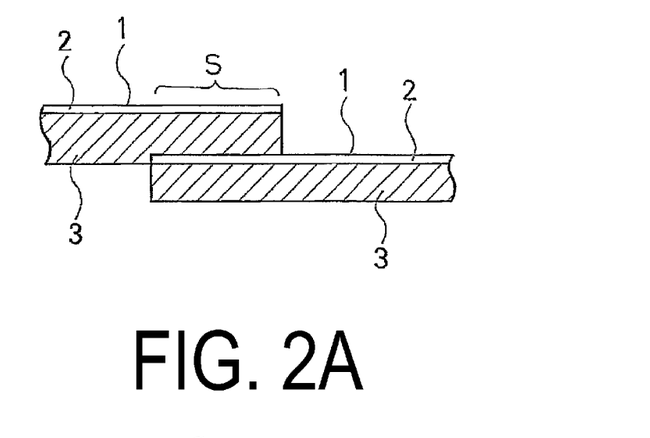
FIG. 2A is a model diagram illustrating a state in which, using sheet laminate 1 obtained by laminating an elastomer layer 3 with a sheet 2 comprising a thermoplastic resin or a thermoplastic resin composition having ordinary end sections, the end sections of the sheet laminate 1 are lap-spliced.

When explaining this with reference to the drawings, as illustrated in FIG. 2A, a sheet laminate 1 comprising an elastomer layer 3 and a sheet 2 comprising a thermoplastic resin or a thermoplastic resin composition obtained by blending a thermoplastic resin and an elastomer is cut to a prescribed size (length) with a blade or the like. A lap splice portion S is provided at both end sections so as to form an annular shape, and the end sections are overlapped and spliced on the tire molding drum. When one sheet laminate 1 is used, both end sections are spliced and formed into an annular shape, or when a plurality of the sheet laminates 1 are used, the mutual end sections of each of the laminates are spliced and collectively formed as a single annular shape.

In addition, cutting into a prescribed size may be performed in the state of the sheet laminate 1 obtained by laminating the elastomer layer 3 with the sheet 2 comprising a thermoplastic resin or a thermoplastic resin composition obtained by blending a thermoplastic resin and an elastomer, or both the sheet 2 and the elastomer layer may be laminated after being cut separately.

Further, other parts (not illustrated) required for tire manufacturing are wound, and after being formed as a green tire, the tire undergoes vulcanization molding with a bladder.

Figure 2B:
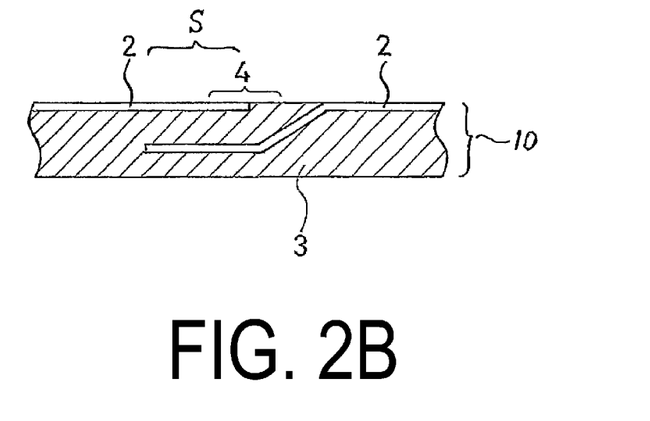
FIG. 2B is a model diagram illustrating an example of the state after vulcanization molding in the state illustrated in FIG. 2A.

After vulcanization molding, an inner liner layer 10 comprising the elastomer layer 3 and the sheet 2 of a thermoplastic resin or a thermoplastic resin composition obtained by blending a thermoplastic resin and an elastomer is formed, and a portion in which the sheet 2 comprising a thermoplastic resin or the aforementioned thermoplastic resin composition is exposed and a portion in which the sheet 2 is embedded in the elastomer layer 3 are formed in the vicinity of the overlapped splice portion S, as illustrated in the model diagram of FIG. 2B.

The phenomenon in which the aforementioned sheet 2 of a thermoplastic resin or a thermoplastic resin composition and the vulcanization-adhered elastomer sheet 3 are separated occurs where the sheet 2 of the thermoplastic resin composition illustrated in FIG. 2B is exposed and at a distal end vicinity 4 of the sheet 2, wherein a crack is first generated, and the crack continues to grow so as to progress into the sheet separation phenomenon.

Such a phenomenon is not limited only to cases in which the sheet laminate 1 is used as an inner liner, and it is thought to similarly occur in cases in which the laminate is used as a reinforcing member or the like inside the tire. In any case, the separation of the sheet 2 or the sheet laminate 1 due to the cracks leads to a reduction in the life of the tire, which is not preferable.

In response to problems such as those described above, attention was focused on the form at the end sections of the sheet 2 or the sheet laminate 1 which are superimposed to form the splice portion S, and it has been proposed that when the end sections are formed by cutting the sheet material, the sheet material is cut at a temperature equal to or lower than the melting point and using a blade with an edge that is not sharp (Japanese Patent No. 5146591B).

The proposal of Japanese Patent No. 5146591B specifically focuses on a form in which the end sections of the sheet 2 or the sheet laminate 1 constituting the splice portion S are sharpened by cutting at a temperature equal to or lower than the melting point and using a guillotine-type blade with an edge that is not sharp. This proposal focuses on the fact that with a form in which the end sections of the sheet 2 or the sheet laminate 1 are sharpened, the occurrence of cracks or separation of the sheet 2 or the sheet laminate 1 can be satisfactorily prevented, resulting in an excellent product which achieves an effect of preventing the occurrence of cracks and separation.

However, it has been difficult to cut the sheet end sections while maintaining an ideal end section form that is stable and uniform over the entire width of a cut section thereof. Therefore, the separation of the sheet 2 may occur at an earlier stage than other portions in some locations, and this may progress and shorten the life of the entire tire, so there have been demands for further improvements.

SUMMARY

The present technology provides a tire manufacturing method having a step in which end sections of a sheet laminate, which are obtained by laminating an elastomer layer with a sheet comprising a thermoplastic resin or a thermoplastic resin composition obtained by blending a thermoplastic resin and an elastomer, are superimposed and molded into an inner liner or reinforcing material. The end sections of the superimposed sheet laminate can be cut while exhibiting an ideal end section form that is stable and uniform over the entire width of a cut section thereof. Thus, on the basis of the cut form, once a pneumatic tire has begun moving, the occurrence of cracks and separation can be satisfactorily prevented in the vicinity of a splice portion of the sheet laminate over a longer period of time, which makes it possible to manufacture a tire with excellent durability.

The tire manufacturing method of the present technology that achieves the object described above has the following constitution (1).

(1) A tire manufacturing method having a step in which end sections of a sheet laminate, which are obtained by laminating an elastomer layer with a sheet comprising a thermoplastic resin or a thermoplastic resin composition obtained by blending a thermoplastic resin composition and an elastomer, are superimposed and molded, the method comprising: positioning a cutting edge cradle on an elastomer layer side of the sheet laminate; pressing a circular blade, which dependently rotates from the side of the sheet comprising a thermoplastic resin or a thermoplastic resin composition in the sheet laminate, against the sheet laminate placed on the cutting edge cradle so as to cut the sheet laminate; and forming end sections of the sheet laminate to be superimposed.

The tire manufacturing method of the present technology more preferably has the constitution of any one of (2) to (10) below.

(2) The tire manufacturing method according to (1), wherein when pressing the circular blade against the sheet side of the sheet comprising a thermoplastic resin or a thermoplastic resin composition in the sheet laminate so as to cut the sheet laminate, cutting is performed by setting the angle $\alpha$ of incidence of the blade to the thermoplastic resin or thermoplastic resin composition to 5 to 40°.

(3) The tire manufacturing method according to (1) or (2), wherein a diameter of the circular blade is from 10 mm to 200 mm.

(4) The tire manufacturing method according to (1) or (2), wherein a diameter of the circular blade is from 30 mm to 100 mm.

(5) The tire manufacturing method according to one of (1) to (4), wherein a cross-sectional shape orthogonal to a rotational axis direction of the circular blade capable of dependent rotation is approximately spindle shaped.

(6) The tire manufacturing method according to one of (1) to (5), wherein a cutting edge angle of the circular blade capable of dependent rotation is at least 5° and at most 60°.

(7) The tire manufacturing method according to one of (1) to (6), wherein the cutting edge cradle is provided with a blade receiving groove at a portion with which the blade makes contact.

(8) The tire manufacturing method according to one of (1) to (6), wherein the cutting edge cradle is provided with a blade receiving groove at a portion, which is made of metal, with which the blade makes contact.

(9) The tire manufacturing method according to one of (1) to (8), wherein the cut end sections of the thermoplastic resin or thermoplastic resin composition of the sheet laminate after cutting exhibit a sharp edge shape due to a cutting force.

(10) The tire manufacturing method according to one of (1) to (9), wherein the cutting performed by pressing the circular blade capable of dependent rotation is performed so as to have a relationship in which a thickness T (μm) satisfies $0.1 \ t \leq T \leq 0.8 \ t$ at a position located inward by a length of $t \times \frac{1}{3}$ from the leading edge of the sheet comprising a thermoplastic resin or a thermoplastic resin composition obtained by blending an elastomer with the thermoplastic resin.

Here, t is the average thickness (μm) in the tire circumferential direction of the sheet (not including variant parts due to cutting) comprising a thermoplastic resin or a thermoplastic resin composition obtained by blending an elastomer with the thermoplastic resin, and T is the thickness (μm) of the sheet at a position located inward by a length of $t \times \frac{1}{3}$ from the leading edge of the sheet comprising a thermoplastic resin or a thermoplastic resin composition obtained by blending an elastomer with the thermoplastic resin.

The tire manufacturing method of the present technology according to claim 1 provides a tire manufacturing method having a step in which end sections of a sheet laminate, which are obtained by laminating an elastomer layer with a sheet comprising a thermoplastic resin or a thermoplastic resin composition obtained by blending a thermoplastic resin and an elastomer, are superimposed and molded. In the method, the end sections of the superimposed sheet laminate can be cut while exhibiting an ideal end section form that is stable and uniform over the entire width of a cut section thereof. As a result, on the basis of the cut form, once a pneumatic tire has begun moving, the occurrence of cracks and separation can be satisfactorily prevented in the vicinity of a splice portion of the sheet laminate over a longer period of time, which makes it possible to manufacture a tire with excellent durability.

With the tire manufacturing method of the present technology according to any one of claims 2 to 10, it is possible to achieve the effect of the present technology according to claim 1 and to achieve the effect more reliably and to a greater extent.

BRIEF DESCRIPTION OF THE DRAWING(S)

FIGS. 5A and 5B are model diagrams illustrating an example of a circular blade that can be preferably used in the present technology.

DETAILED DESCRIPTION

The tire manufacturing method of the present technology will be described in further detail hereinafter with reference to the drawings and the like.

Figure 3:
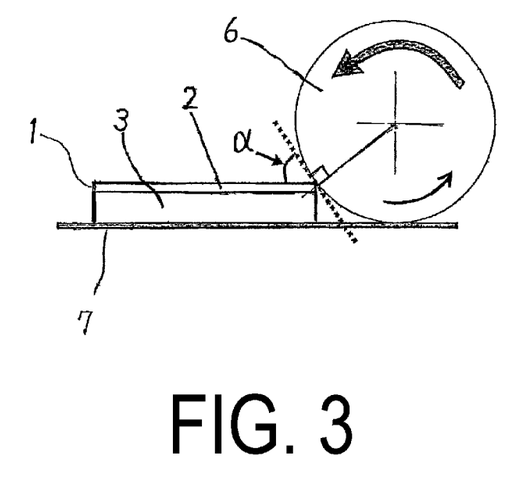
FIG. 3 is a model diagram illustrating a state in which lap-spliced end sections are formed by cutting a sheet laminate by pressing a circular blade, which rotates dependently in accordance with the method of the present technology, into the sheet laminate.

As illustrated in the model diagram of FIG. 3, the tire manufacturing method of the present technology is a tire manufacturing method having a step in which end sections of a sheet laminate 1, which are obtained by laminating an elastomer layer 3 with a sheet 2 comprising a thermoplastic resin or a thermoplastic resin composition obtained by blending a thermoplastic resin and an elastomer, are superimposed and molded. The method comprises: positioning a cutting edge cradle 7 on an elastomer layer side of the sheet laminate 1; pressing a circular blade 6, which dependently rotates from the side of the sheet 2 comprising a thermoplastic resin or a thermoplastic resin composition in the sheet laminate 1, against the sheet laminate 1 placed on the cutting edge cradle 7 so as to cut the sheet laminate 1; and forming end sections of the sheet laminate 1 to be superimposed. The sheet laminate 1 is subjected to the molding described above so as to constitute an inner liner or a reinforcing material.

With the method of the present technology, the sheet laminate 1 is cut by pressing the circular blade 6, which dependently rotates from the side of the sheet 2 comprising a thermoplastic resin or a thermoplastic resin composition in the sheet laminate 1, against the sheet laminate, and the sheet laminate is cut while extending the sheet 2 comprising a thermoplastic resin or a thermoplastic resin composition so as to press it up to the cutting edge cradle 7 while the circular blade 6 rotates. As a result, it is possible to form the cross-sectional shape of the leading edge sections of the sheet 2 so that the leading edges are sharpened.

Figure 4:
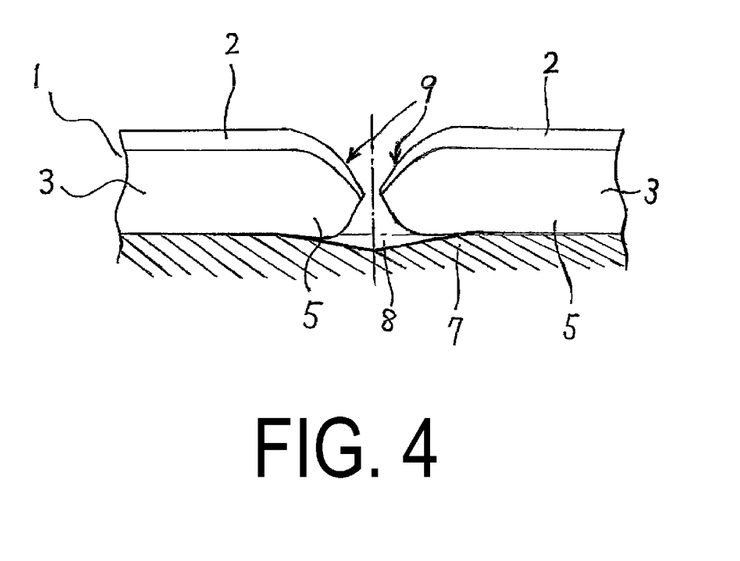
FIG. 4 is a model diagram illustrating a state after cutting of lap-spliced end sections formed by cutting the sheet laminate by pressing a circular blade, which rotates dependently in accordance with the method of the present technology, into the sheet laminate.

FIG. 4 is a model diagram illustrating a state of the sheet laminate 1 after being cut in this way, and this drawing is viewed from a direction shifted by 90° relative to FIG. 3. The sheet 2 comprising a thermoplastic resin or a thermoplastic resin composition in the sheet laminate 1 exhibits a sharpened shape in which the leading edge sections become narrow so as to be extended toward a blade receiving groove 8 on the cutting edge cradle 7.

In this sheet laminate 1, by performing lap splicing using a sheet laminate having a shape in which the cross-sectional shapes of the leading edge sections of the sheet 2 comprising a thermoplastic resin or a thermoplastic resin composition are sharpened, it is possible to satisfactorily prevent the occurrence of cracks and separation in the vicinity of the end sections of the sheet 2 or the sheet laminate 1.

In particular, with the method of the present technology, it is possible to cut the end sections of the superimposed sheet laminate 1 while exhibiting an ideal end section form that is stable and uniform over the entire width of the cut part thereof, compared to using a guillotine-type cutter. As a result, it is possible to achieve an effect of preventing the occurrence of cracks and separation of the sheet 2 or the sheet laminate 1 described above over a long period of time once a pneumatic tire has begun moving on the basis of the cut form.

In the method of the present technology, when pressing the circular blade 6 against the sheet laminate on the side of the sheet 2 comprising the thermoplastic resin or the thermoplastic resin composition so as to cut the sheet laminate 1, cutting is preferably performed by setting the angle α of incidence of the blade to the sheet 2 comprising a thermoplastic resin or a thermoplastic resin composition to 5 to 40°. According to the findings of the present inventors, the sheet 2 can be cut while efficiently extending the sheet 2 by pressing the circular blade 6 so that the angle α of incidence is within a range from 5 to 40°. In particular, when cutting is performed by setting the angle α of incidence within a range from 10 to 30°, this effect is even more substantial, which is more preferable.

In order to realize the angle α of incidence described above, since the thickness of the sheet laminate 1 is typically within a range from just under 1 mm to several mm, the diameter of the circular blade 6 is preferably from 10 mm to 200 mm and is most preferably from 30 mm to 100 mm. The thickness of the sheet laminate 1 is preferably from 20 to 500 µm. Of these settings, from the perspective of the application of the sheet laminate, the thickness is preferably from 50 to 300 µm when used as a reinforcing sheet, and the thickness is preferably from 30 to 300 µm when used as a sheet for constituting an inner liner layer.

It is important for the circular blade 6 to rotate dependently rather than being actively driven to rotate, and the blade moves and advances in the cutting direction while rotating. This movement may be relative, and a cutting edge cradle 7 also serving as a sheet stand may also move without any movement in the position of the rotating blade.

It is essential to use the cutting edge cradle 7 in order to reliably perform the dependent rotation of the circular blade and in order to perform cutting while reliably extending the sheet 2 comprising a thermoplastic resin or a thermoplastic resin composition in the sheet laminate 1 in the direction of the cutting edge cradle 7 at the time of cutting. In addition, the cutting edge cradle 7 is preferably provided with a blade receiving groove 8 at a portion with which the blade 6 makes contact in that the effect described above can be achieved reliably. The blade receiving groove 8 illustrated in FIG. 4 is one in which the cross-sectional shape of the groove space is an isosceles triangle.

Figure 5A:
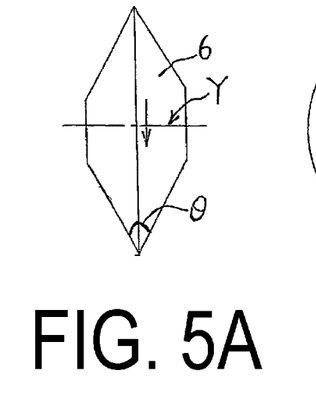
FIG. 5A is a front view from a direction orthogonal to the direction of the rotational axis Y.
Figure 5B:
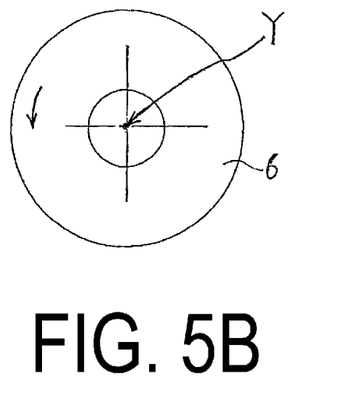
FIG. 5B is a right side view thereof.

As illustrated in the model diagrams of FIGS. 5A and 5B, the shape of the circular blade 6 capable of dependent rotation is preferably such that the cross-sectional shape orthogonal to the direction of the rotational axis Y is approximately spindle shaped. "Approximately spindle shaped" refers to a form in which the upper and lower parts both become narrower as the distance from the rotational axis Y increases, as illustrated in FIG. 5.

As illustrated in FIG. 5, the cutting edge angle θ of the circular blade 6 is preferably at least 5° and at most 60° in that the laminate can be cut while exhibiting a uniform, preferable end section form. The leading edge section of the blade may be rounded in order to reduce the sharpness of the blade somewhat. This is because at the time of cutting, this contributes to the cutting of the sheet 2 while exhibiting a sharp edge shape so as to reliably extend the sheet in the direction of the cutting edge cradle 7, and this effect is particularly substantial when used in combination with a blade receiving groove 8 described below.

Figure 6:
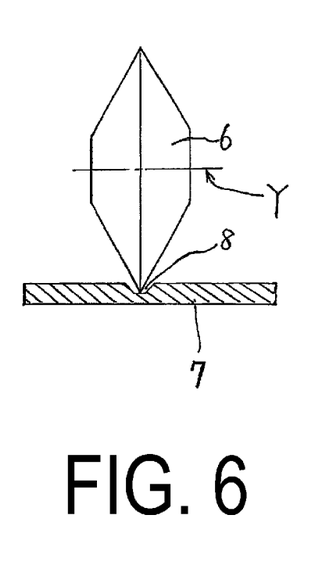
FIG. 6 is a model diagram illustrating an engaged state of the same circular blade as that illustrated in FIG. 5A and a blade receiving groove 8 having a groove space with a trapezoidal cross section where the base is narrow.

In addition, the cutting edge cradle 7 is preferably provided with a blade receiving groove 8 at a portion with which the blade makes contact. This is because by providing the cutting edge cradle 7 with a blade receiving groove 8 with which the blade makes contact, it is possible to cut the laminate into a more desirable shape. The cross-sectional shape for the groove space of the blade receiving groove 8 may be an isosceles triangle shape (V-shape) such as that illustrated in FIG. 4, a trapezoidal shape with a narrowing base such as that illustrated in FIG. 6, a U-shape, or the like. The cutting edge cradle is preferably made of metal, a hard resin, or the like.

The cut end sections of the sheet 2 comprising a thermoplastic resin or a thermoplastic resin composition in the sheet laminate 1 after being cut by the method of the present technology are characterized in that the leading edges thereof exhibit a sharpened shape due to the cutting force of the rotating blade and in that they exhibit a uniform and satisfactory sharpened shape over the entire cutting width.

FIG. 4 illustrates an example of a model of the shape immediately after cutting, wherein the leading edge sections 9 of the sheets 2 exhibit a beveled shape so as to sag downward to the side of elastomer layer 3.

Figure 1A:
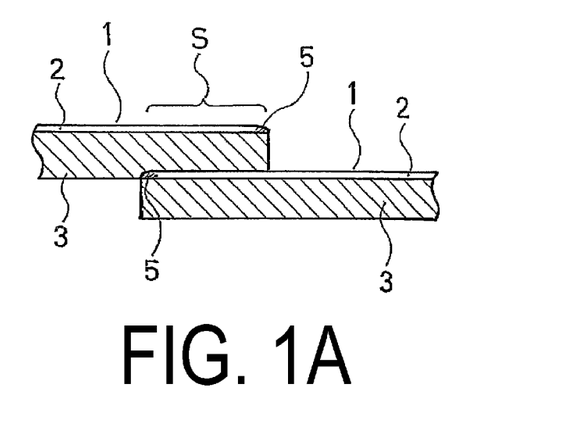
FIG. 1A is a model diagram illustrating a state in which, using sheet laminate 1 which are obtained by laminating an elastomer layer 3 with a sheet 2 comprising a thermoplastic resin or a thermoplastic resin composition, and which have a shape in which the leading edge section that is cut, at a prescribed length, by pressing the circular blade of the method of the present technology is sharpened, the end sections of the sheet laminate 1 are lap-spliced.
Figure 1B:
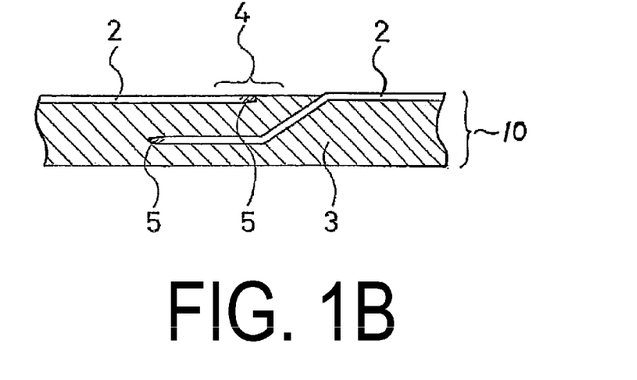
FIG. 1B is a model diagram illustrating a state of this section after the tire is subjected to vulcanization molding in the state illustrated in FIG. 1A.
Figure 1C:
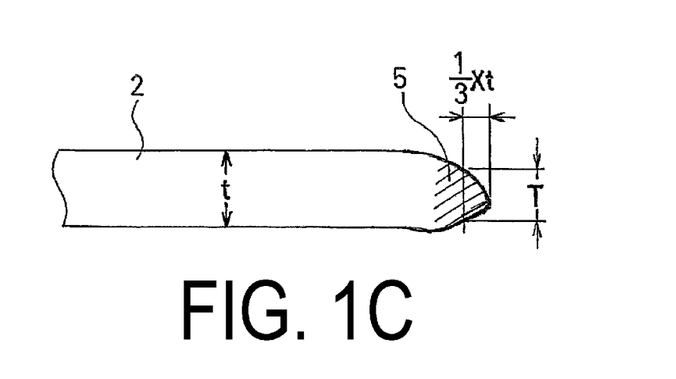
FIG. 1C is a schematic side view for explaining an example of the shape of the cut leading edge after the vulcanization molding of the sheet 2 comprising a thermoplastic resin or a thermoplastic resin composition that is cut with a method of cutting by pressing the circular blade of the method of the present technology into the laminate as a model.

The shape of the leading edge section 5 of the sheet 2 obtained by cutting are preferably formed so as to have a relationship in which the thickness T (μm) of the sheet satisfies $0.1 \ t \leq T \leq 0.8 \ t$ at a position located inward by a length of $t \times \frac{1}{3}$ from the leading edge of the sheet 2 as illustrated in FIG. 1C. More preferably, the relation $0.2 \ t \leq T \leq 0.6 \ t$ is satisfied.

Here, t is the average thickness (μm) in the tire circumferential direction of the sheet 2 (not including variant parts due to cutting) comprising a thermoplastic resin or a thermoplastic resin composition obtained by blending an elastomer with the thermoplastic resin, and T is the thickness (μm) of the sheet at a position located inward by a length of $t \times \frac{1}{3}$ from the leading edge of the sheet comprising a thermoplastic resin or a thermoplastic resin composition obtained by blending an elastomer with the thermoplastic resin.

Figure 7:
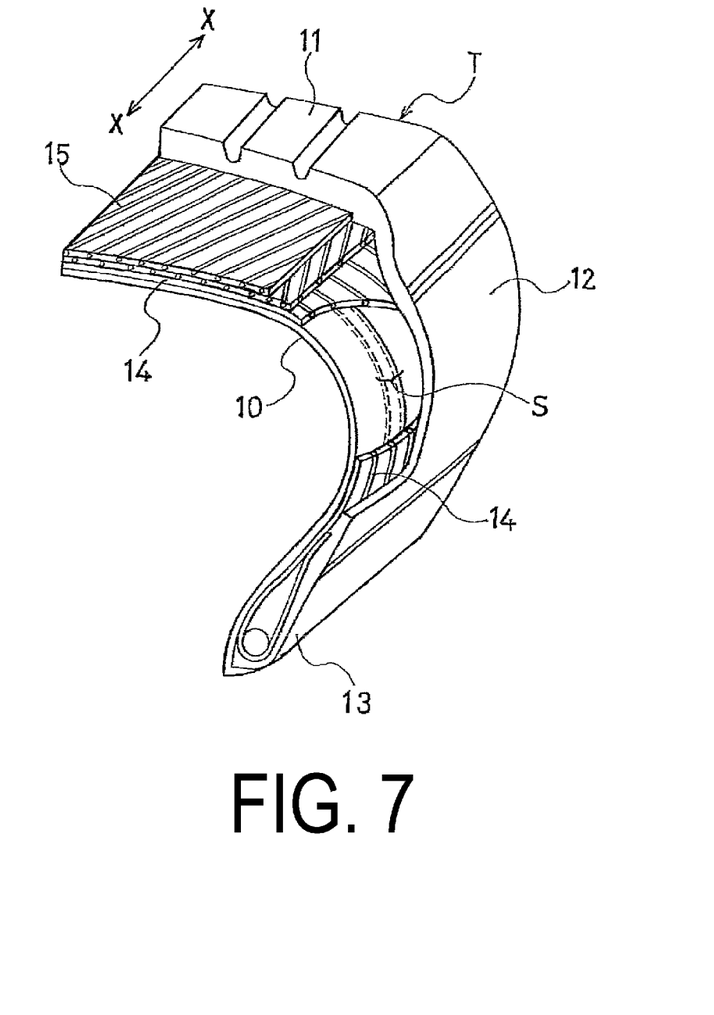
FIG. 7 is a partial fragmented perspective view illustrating an example of an aspect of a pneumatic tire obtained by the tire manufacturing method of the present technology.

FIG. 7 is a partial fragmented perspective view illustrating an example of an aspect of a tire obtained by the tire manufacturing method of the present technology, and this drawing illustrates an example in which a sheet laminate 1 is provided as an inner liner layer 10.

As illustrated in FIG. 7, a tire T is provided so that side wall portions 12 and bead portions 13 communicate on the left and right with a tread portion 11. On the tire inner side thereof, a carcass layer 14 that acts as a framework for the tire is provided so as to extend between the left and right bead portions 13, 13 in the tire width direction. Two belt layers 15 composed of steel cords are provided on the outer circumferential side of the carcass layer 14 corresponding to the tread portion 11. The arrow X indicates the tire circumferential direction. An inner liner layer 10 composed of the sheet laminate 1 is disposed on the inside of the carcass layer 14, and a lap splice portion S extends in the tire width direction.

In a tire using a sheet laminate 1 as an inner liner layer 10, such as that illustrated in FIG. 7, the occurrence of cracks that often occur conventionally in the vicinity of the lap splice portion S on the tire inner circumferential surface, and the occurrence of cracks and separation between the tie rubber layer (elastomer layer) 3 and the sheet 2 comprising a thermoplastic resin or a thermoplastic resin composition forming the inner liner layer 10 are all suppressed, and the durability of the tire is substantially improved.

While the overlapping length of the lap splice portion S also depends on the tire size, the length is preferably around 7 to 20 mm and more preferably around 8 to 15 mm. This is because if the overlapping length is too large, the uniformity tends to worsen, whereas if the overlapping length is too small, there is a risk that the splice part may open at the time of molding, which is not preferable.

The sheet laminate 1 described above can be used as an inner liner layer of a pneumatic tire or may be used for a purpose other than an inner liner layer. For example, the laminate may be used as a reinforcing sheet layer for reinforcing specific portions of the tire.

In the present technology, when the sheet laminate is used as an inner liner layer (air penetration preventing layer), it should be disposed at a position where it would be disposed as an ordinary inner liner layer. In this case, the sheet laminate of the present technology may be used as a reinforcing layer for the inner liner layer.

In the case of an aspect in which the laminate is used as a reinforcing layer, it is effective for the laminate to be disposed at a portion adjacent to a rubber layer as a reinforcing layer such as a carcass layer or a belt layer, for example, inside the tire, or it may be used in a bead portion or a tire surface portion (which is both the external surface and the cavity-side surface) such as a side portion or tread portion. In particular, when disposed on the side portion and/or a shoulder portion, it is possible to achieve an anti-reinforcing effect. In any case, when the laminate has a lap splice portion, the effect of the present technology described above can be achieved.

The thermoplastic resin to be used in the present technology is preferably a polyamide resin, [e.g., nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 9T, nylon 6/6T copolymer, nylon 66/PP copolymer, nylon 66/PPS copolymer] and an N-alkoxyalkyl compound thereof, e.g., a methoxymethyl compound of nylon 6, a methoxymethyl compound of a nylon 6/610 copolymer, or a methoxymethyl compound of nylon 612; a polyester resin [e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a crystal polyester, a polyoxyalkylene diimide acid/polybutylene terephthalate copolymer]; a polynitrile resin [e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer], a polymethacrylate resin [e.g., polymethyl-methacrylate (PMMA), polyethyl-methacrylic acid], a polyvinyl resin [e.g., polyvinyl acetate, a polyvinyl alcohol (PVA), a vinyl alcohol/ethylene copolymer (EVOH), polyvinylidene chloride (PVDC), polyvinylchloride (PVC), a vinyl chloride/vinylidene chloride copolymer, a vinylidene chloride/methylacrylate copolymer, a vinylidene chloride/acrylonitrile copolymer (ETFE)], a cellulose resin [e.g., cellulose acetate, cellulose acetate butyrate], a fluoride resin [e.g., polyvinylidene difluoride (PVDF), polyvinyl fluoride (PVF), polychlorofluoroethylene (PCTFE), a tetrafluoroethylene/ethylene copolymer], or an imide resin [e.g., an aromatic polyimide (PI)].

Furthermore, in the thermoplastic resin and the elastomer that constitute the thermoplastic resin composition that can be used in the present technology, the above may be used as the thermoplastic resin. The elastomer to be used preferably includes a diene-based rubber and a hydrogenate thereof [e.g., natural rubber (NR), isoprene rubber (IR), epoxidized natural rubber, styrene butadiene rubber (SBR), butadiene rubber (BR, high cis-BR, low cis-BR), nitrile rubber (NBR), hydrogenated NBR, hydrogenated SBR], an olefin rubber [e.g., ethylene propylene rubber (EPDM, EPM), maleic acid ethylene modified propylene rubber (M-EPM), butyl rubber (IIR), an isobutylene and aromatic vinyl or diene-based monomer copolymer, acrylic rubber (ACM), an ionomer], a halogen-containing rubber [e.g., Br-IIR, Cl-IIR, a brominated isobutylene-p-methylstyrene copolymer (BIMS), chloroprene rubber (CM), a hydrin rubber (CHR), chlorosulfonated polyethylene rubber (CSM), chlorinated polyethylene rubber (CM), chlorinated polyethylene rubber modified with maleic acid (M-CM)], a silicon rubber [e.g., methyl vinyl silicon rubber, dimethyl silicon rubber, methylphenyl vinyl silicon rubber], a sulfur-containing rubber [e.g., polysulfide rubber], a fluororubber [e.g., a vinylidene fluoride rubber, a vinyl ether rubber containing fluoride, a tetrafluoroethylene-propylene rubber, a silicon-based rubber containing fluoride, a phosphazene rubber containing fluoride], and a thermoplastic elastomer [e.g., a styrene elastomer, an olefin elastomer, an ester elastomer, a urethane elastomer, a polyamide elastomer].

Moreover, when the compatibility is different upon blending by combining the previously specified thermoplastic resin and the previously specified elastomer, a suitable compatibility agent may be used as a third component to enable compatibilization of both the resin and the elastomer. By mixing the compatibility agent in the blend, interfacial tension between the thermoplastic resin and the elastomer is reduced, and as a result, the particle diameter of the elastomer that forms the dispersion phase becomes very small and thus the characteristics of both components may be realized effectively. In general, such a compatibility agent generally has a copolymer structure of both or either the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; a EPDM, EPM, EPDM/styrene or EPDM/acrylonitrile graft copolymer or a maleic acid modified compound thereof; a styrene/maleic acid copolymer, or a reactive phenoxy, and the like. The blending quantity of such a compatibility agent, while not being limited, is preferably 0.5 to 10 parts by weight with respect to 100 parts by weight of the polymer component (total of the thermoplastic resin and the elastomer).

A composition ratio of the specified thermoplastic resin and the elastomer in the thermoplastic resin composition obtained by blending a thermoplastic resin with an elastomer, is not limited in particular, may be determined as appropriate to establish a dispersed structure as a discontinuous phase of the elastomer in the matrix of the thermoplastic resin, and is preferably in a range of a weight ratio of 90/10 to 30/70.

In the present technology, a compatibility agent or other polymer within a range that does not harm the characteristics required for an inner liner or a reinforcing layer may be mixed with the thermoplastic resin or the thermoplastic resin composition obtained by blending a thermoplastic resin with an elastomer. The purposes of mixing such a polymer are to improve the compatibility between the thermoplastic resin and the elastomer, to improve the molding workability of the material, to improve the heat resistance, to reduce cost, and the like. Examples of the material used for the polymer include polyethylene (PE), polypropylene (PP), polystyrene (PS), ABS, SBS, and polycarbonate (PC).

Furthermore, the elastomer can be dynamically vulcanized when being mixed in with the thermoplastic resin. A vulcanizer, a vulcanization aid, vulcanization conditions (temperature, time), and the like used at the time of dynamic vulcanization can be determined as appropriate in accordance with the composition of the elastomer to be added, and are not particularly limited.

Furthermore, a reinforcing agent such as a filler (calcium carbonate, titanium oxide, alumina, and the like), carbon black, or white carbon, a softening agent, a plasticizer, a processing aid, a pigment, a dye, an anti-aging agent, or the like that are generally blended with polymer compounds may be optionally blended so long as the characteristics required for an inner liner or reinforcing layer are not impaired. The thermoplastic resin composition has a structure in which the elastomer is distributed as a discontinuous phase in the matrix of the thermoplastic resin. By having such a structure, it becomes possible to provide the inner liner or the reinforcing layer with sufficient flexibility and sufficient stiffness that is attributed to the effect of the resin layer as a continuous phase. Furthermore, it becomes possible to obtain, during molding, a molding workability equivalent to that of the thermoplastic resin regardless of the amount of the elastomer.

The Young's moduli of the thermoplastic resin and the elastomer that may be used in the present technology, while not limited in particular, are both preferably 1 to 500 MPa, and more preferably 50 to 500 MPa.

EXAMPLES

The constitution and effects of the present technology will be described specifically hereinafter based on working examples in which pneumatic tires were manufactured with the manufacturing method of the present technology.

The sheet laminate in the tire manufacturing method of the present technology was used as an inner liner to manufacture a tire in each of the working examples and comparative examples.

Each pneumatic tire was evaluated by determining the total length of a crack generated along the splice in the vicinity of the splice portion of the inner liner in the inner cavity of each test tire.

As test tires, 215/70R1598H tires were used, and two tires were produced for each of the working examples and comparative examples. Each test tire was attached to a JATMA standard rim 15×6.5JJ, and after traveling 50,000 km at a speed of 80 km/hr with an internal tire pressure of 240 kPa under a load of 8.82 kN (120% of the JATMA maximum load), the tire was evaluated by determining the total length of a crack using the method described above.

Working Examples 1 to 6 and Comparative Examples 1 and 2

A composition shown in Table 1 (thickness: 130 μm) was used as the thermoplastic resin composition for constituting an inner liner in all of the Working Examples 1 to 6 and Comparative Examples 1 and 2, and the composition shown in Table 2 for adhering to the thermoplastic resin composition (thickness: 0.7 mm) was used as an elastomer layer (tire rubber layer).

Working Examples 1 to 6 are all based on the present technology, wherein the diameter of the circular blade and the angle θ of the cutting edge were variously modified. Comparative Example 1 is an example in which cutting was performed with an ordinary cutter, and the cut leading edge portions were not sharpened. Comparative Example 2 is an example in which cutting was performed with a guillotine-type cutter, and the sharpening of the leading edge portions of the cut end sections was recognized, but when observed in terms of the sharp edge shape over the entire cutting length, it was observed to be inferior to all of the Working Examples 1 to 6.

The total lengths of the cracks that were generated are as shown in Table 3. The pneumatic tires manufactured with the method of the present technology exhibited practically no crack generation and exhibited excellent durability.

TABLE 1

|  |  | Parts by mass |
|---|---|---|
| BIMS[a] | "Exxpro 3035" made by Exxon Mobile Chemical Co., Ltd. | 100 |
| Zinc oxide | "Zinc oxide III" made by Seido Chemical Industry Co., Ltd. | 0.5 |
| Stearic acid | Industrial stearic acid | 0.2 |
| Zinc stearate | "Zinc stearate" made by NOF Corporation | 1 |
| N6/66 | "UBE Nylon (5033B)" made by Ube Industries, Ltd. | 100 |
| Modified EEA[b] | "HPR-AR201" made by Dupont-Mitsui Polychemicals Co., Ltd. | 10 |

Remarks:
[a] A brominated isobutylene-p-methylstyrene copolymer
[b] Maleic anhydride-modified ethylene-ethylacrylate copolymer

TABLE 2

|  |  | Parts by mass |
|---|---|---|
| Styrene butadiene rubber | Made by Zeon Corporation "Nipol 1502" | 50 |
| Natural rubber | SIR-20 | 50 |
| Carbon black | Made by Tokai Carbon Co., Ltd "Seast V" | 60 |
| Stearic acid | Industrial stearic acid | 1 |
| Aromatic oil | Made by Showa Shell Sekiyu KK "Aroma oil: Desolex No. 3" | 7 |
| Zinc oxide | Made by Seido Chemical Industry Co., Ltd. "Zinc oxide III" | 3 |
| Modified resorcin formaldehyde condensate | Made by Taoka Chemical Co., Ltd. "Sumikanol 620" | 2 |
| Methylene donor | Modified ether methylolmelamine made by Taoka Chemical Co., Ltd. "Sumikanol 507 AP" | 6 |
| Sulfur | 5% oil-extension treated sulfur | 6 |
| Vulcanization accelerator | Di-2-benzothiazolyl disulfide made by Ouchi Shinko Chemical Industrial Co., Ltd. "NOCCELER DM" | 2.2 |

TABLE 3

|  | Comparative example 1 | Comparative example 2 | Working Example 1 | Working Example 2 | Working Example 3 | Working Example 4 | Working Example 5 | Working Example 6 |
|---|---|---|---|---|---|---|---|---|
| Cutting method | Straight line Cutter | Guillotine-type cutter | Dependent rotation-type circular blade | Dependent rotation-type circular blade | Dependent rotation-type circular blade | Dependent rotation-type circular blade | Dependent rotation-type circular blade | Dependent rotation-type circular blade |
| Circular blade diameter (mm) | — | — | 10 | 50 | 200 | 50 | 50 | 50 |
| Cutting edge angle θ (°) | — | — | 30 | 30 | 30 | 5 | 60 | 60 |
| Angle α of incidence (°) | — | — | 34° | 15° | 7° | 15° | 15° | 15° |
| Cutting temperature (° C.) | Room temperature | Same as to the left | Same as to the left | Same as to the left | Same as to the left | Same as to the left | Same as to the left | 180° C. |
| Crack length (mm) | 152 mm | 62 mm | No cracks | Same as to the left | Same as to the left | Same as to the left | Same as to the left | Same as to the left |

What is claimed is:

1. A tire manufacturing method having a step in which end sections of a sheet laminate, which are obtained by laminating an elastomer layer with a sheet comprising a thermoplastic resin or a thermoplastic resin composition obtained by blending a thermoplastic resin composition and an elastomer, are superimposed and molded, the method comprising: positioning a cutting edge cradle on an elastomer layer side of the sheet laminate; pressing a circular blade, which rotates, rotation of the circular blade being not actively driven, from a side of the sheet comprising a thermoplastic resin or a thermoplastic resin composition in the sheet laminate, against the sheet laminate placed on the cutting edge cradle so as to cut the sheet laminate, wherein one of the circular blade or the cutting edge cradle moves relative to another one of the circular blade or the cutting edge cradle when cutting, wherein a cutting edge angle of the circular blade is at least 7° and at most 60°, and wherein the cut end sections of the thermoplastic resin or thermoplastic resin composition of the sheet laminate, after cutting, exhibit a sharp edge shape due to a cutting force, the cutting edge cradle is provided with a blade receiving groove at a portion with which the circular blade makes contact as a recess, and a part of the cutting edge cradle excluding the blade receiving groove is flat; and forming end sections of the sheet laminate to be superimposed.

2. The tire manufacturing method according to claim 1, wherein when pressing the circular blade against the side of the sheet comprising a thermoplastic resin or a thermoplastic resin composition in the sheet laminate so as to cut the sheet laminate, cutting is performed by setting an angle $\alpha$ of incidence of the circular blade to the thermoplastic resin or thermoplastic resin composition to 5 to 40°.

3. The tire manufacturing method according to claim 1, wherein a diameter of the circular blade is from 10 mm to 200 mm.

4. The tire manufacturing method according to claim 1, wherein a diameter of the circular blade is from 30 mm to 100 mm.

5. The tire manufacturing method according to claim 1, wherein the blade receiving groove is made of metal.

6. The tire manufacturing method according to claim 1, wherein the cutting performed by pressing the circular blade capable of dependent rotation is performed so as to have a relationship in which a thickness T (μm) satisfies $0.1t \leq T \leq 0.8t$ at a position located inward by a length of $t \times \frac{1}{3}$ from the leading edge of the sheet comprising a thermoplastic resin or a thermoplastic resin composition obtained by blending an elastomer with the thermoplastic resin (t is an average thickness (μm) in a tire circumferential direction of the sheet (not including variant parts due to cutting) comprising a thermoplastic resin or a thermoplastic resin composition obtained by blending an elastomer with the thermoplastic resin, and T is a thickness (m) of the sheet at a position located inward by a length of $t \times \frac{1}{3}$ from the leading edge of the sheet comprising a thermoplastic resin or a thermoplastic resin composition obtained by blending an elastomer with the thermoplastic resin).

7. The tire manufacturing method according to claim 1, wherein a cross-sectional shape orthogonal to a rotational axis direction of the circular blade capable of dependent rotation is approximately spindle shaped.

8. The tire manufacturing method according to claim 7, wherein the cross-sectional shape orthogonal to a rotational axis direction of the circular blade is wider in a radial center of the circular blade and tapers on both sides of the circular blade at both ends of the circular blade.

9. A tire manufacturing method having a step in which end sections of a sheet laminate, which are obtained by laminating an elastomer layer with a sheet comprising a thermoplastic resin or a thermoplastic resin composition obtained by blending a thermoplastic resin composition and an elastomer, are superimposed and molded, the method comprising: positioning a cutting edge cradle on an elastomer layer side of the sheet laminate; pressing a circular blade, which rotates, rotation of the circular blade being not actively driven, from a side of the sheet comprising a thermoplastic resin or a thermoplastic resin composition in the sheet laminate, against the sheet laminate placed on the cutting edge cradle so as to cut the sheet laminate, wherein one of the circular blade or the cutting edge cradle moves relative to another one of the circular blade or the cutting edge cradle when cutting, wherein a cutting edge angle of the circular blade is at least 7° and at most 60°, and wherein a diameter of the circular blade is from 30 mm to 100 mm, the cutting edge cradle is provided with a blade receiving groove at a portion with which the circular blade makes contact as a recess, and a part of the cutting edge cradle excluding the blade receiving groove is flat; and forming end sections of the sheet laminate to be superimposed.

10. The tire manufacturing method according to claim 9, wherein the cut end sections of the thermoplastic resin or thermoplastic resin composition of the sheet laminate after cutting exhibit a sharp edge shape due to a cutting force.

* * * * *